United States Patent
Li et al.

(10) Patent No.: US 10,860,496 B2
(45) Date of Patent: Dec. 8, 2020

(54) METHOD, APPARATUS AND COMPUTER READABLE MEDIUM FOR BUILDING MULTI-TIER FLASH CACHE BY USING SPARE FLASH DRIVES AND CLEAN USER DATA IS FLUSHED FROM MAIN FLASH CACHE TO ONE OF THE SPARE FLASH DRIVES THAT ONLY STORES THE CLEAN USER DATA, WHEREIN THE MAIN FLASH CACHE IS CONFIGURED AS ONE OR MORE PAIRS OF FLASH DRIVES AND THE ONE OF THE SPARE FLASH DRIVES IS ALLOCATED AS SINGLE DRIVE TO SECONDARY FLASH CACHE

(71) Applicant: EMC IP Holding Company, Hopkinton, MA (US)

(72) Inventors: Liam Li, Beijing (CN); Xinlei Xu, Beijing (CN); Jian Gao, Beijing (CN); Lifeng Yang, Beijing (CN); Ruiyong Jia, Beijing (CN); Yousheng Liu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/954,720

(22) Filed: Apr. 17, 2018

(65) Prior Publication Data
US 2018/0300240 A1 Oct. 18, 2018

(30) Foreign Application Priority Data
Apr. 17, 2017 (CN) .......................... 2017 1 0250534

(51) Int. Cl.
*G06F 12/0897* (2016.01)
*G06F 12/122* (2016.01)

(52) U.S. Cl.
CPC ........ *G06F 12/0897* (2013.01); *G06F 12/122* (2013.01); *G06F 2212/1024* (2013.01);
(Continued)

(58) Field of Classification Search
CPC ............... G06F 12/0897; G06F 12/122; G06F 2212/225; G06F 2212/262; G06F 2212/222; G06F 2212/1024
See application file for complete search history.

(56) References Cited

U.S. PATENT DOCUMENTS 6,081,802 A * 6/2000 Atherton ................. G06T 9/004
707/803
6,148,368 A * 11/2000 DeKoning .......... G06F 12/0866
710/53

(Continued)

FOREIGN PATENT DOCUMENTS

JP 6015700 B * 10/2015

OTHER PUBLICATIONS

Anonymous, A Method to Expand SSD Cache Using Hot Spare Disks, Jan. 6, 2014, IP.com. (Year: 2014).*

(Continued)

*Primary Examiner* — William B Partridge
*Assistant Examiner* — Chie Yew
(74) *Attorney, Agent, or Firm* — BainwoodHuang (57) ABSTRACT

A computer-implemented method for establishing a multi-tier flash cache using spare drives. The method includes, in response to receiving an I/O request, determining that there is no free page in a main cache. Having determined that there is no free page in the main cache, the method further includes establishing a secondary cache by selecting at least one spare drive from a plurality of spare drives, flushing data from a cold page in the main cache to the secondary cache, an access frequency of the cold page being lower than a (Continued)

predetermined threshold, and writing data related to the I/O request from a persistent storage device to the cold page.

17 Claims, 10 Drawing Sheets

(52) U.S. Cl.
CPC .. *G06F 2212/222* (2013.01); *G06F 2212/225* (2013.01); *G06F 2212/262* (2013.01)

(56) References Cited

U.S. PATENT DOCUMENTS

| | | | |
|---|---|---|---|
| 6,243,795 B1* | 6/2001 | Yang et al. | G06F 12/00 711/159 |
| 7,174,422 B1 | 2/2007 | Kowalchik et al. | |
| 7,502,886 B1 | 3/2009 | Kowalchik et al. | |
| 7,701,700 B2* | 4/2010 | Hall et al. | G06F 1/16 361/679.33 |
| 7,895,467 B2* | 2/2011 | Onabe et al. | G06F 11/00 714/7 |
| 8,117,235 B1 | 2/2012 | Barta | |
| 8,315,995 B1* | 11/2012 | Levy | G06F 3/0608 707/694 |
| 8,370,597 B1* | 2/2013 | Chatterjee | G06F 3/0604 707/651 |
| 8,769,196 B1* | 7/2014 | Sadhu et al. | G06F 12/00 711/113 |
| 9,201,804 B1* | 12/2015 | Egyed | G06F 12/0893 711/119 |
| 9,785,562 B2* | 10/2017 | Liu et al. | G06F 3/0608 |
| 9,858,185 B1 | 1/2018 | Bent et al. | |
| 9,946,471 B1* | 4/2018 | More et al. | G06F 3/0616 |
| 10,049,046 B1 | 8/2018 | Michaud et al. | |
| 2003/0237019 A1* | 12/2003 | Kleiman | G06F 11/1092 714/6.32 |
| 2005/0060383 A1* | 3/2005 | Lovett | G06F 12/0859 709/213 |
| 2006/0004957 A1* | 1/2006 | Hand, III et al. | G06F 12/00 711/113 |
| 2010/0042773 A1* | 2/2010 | Yeh | G06F 12/00 711/103 |
| 2011/0078393 A1* | 3/2011 | Lin | G06F 12/00 711/155 |
| 2011/0107031 A1* | 5/2011 | Anand | G06F 12/084 711/122 |
| 2011/0238908 A1* | 9/2011 | Kurita | G06F 12/08 711/113 |
| 2012/0266050 A1* | 10/2012 | Cideciyan | G06F 11/1068 714/773 |
| 2012/0297140 A1* | 11/2012 | Wu | G06F 12/0871 711/133 |
| 2013/0036266 A1* | 2/2013 | Naganuma | G06F 3/061 711/114 |
| 2013/0132628 A1* | 5/2013 | Horn et al. | G06F 12/00 711/103 |
| 2013/0132638 A1* | 5/2013 | Horn | G06F 12/0871 711/103 |
| 2013/0238851 A1* | 9/2013 | Chang et al. | G06F 12/08 711/113 |
| 2013/0275672 A1* | 10/2013 | Bert | G06F 12/08 711/113 |
| 2014/0229658 A1* | 8/2014 | Maharan et al. | G06F 12/0246 711/103 |
| 2014/0258612 A1* | 9/2014 | Kalwitz | G06F 11/2087 711/114 |
| 2015/0380110 A1* | 12/2015 | Tamura et al. | G11C 29/50004 |
| 2016/0188424 A1* | 6/2016 | Walls | G06F 11/1662 |
| 2017/0168936 A1* | 6/2017 | Chandrashekar | G06F 16/172 |

OTHER PUBLICATIONS

IBM, Considerations for solid-state drives (SSD), Last updated Nov. 1, 2013, IBM.com, retrieved Mar. 5, 2019 from https://www.ibm.com/support/knowledgecenter/8231-E2C/p7ebk/considerationsforssd.htm (Year: 2013).*

* cited by examiner

METHOD, APPARATUS AND COMPUTER READABLE MEDIUM FOR BUILDING MULTI-TIER FLASH CACHE BY USING SPARE FLASH DRIVES AND CLEAN USER DATA IS FLUSHED FROM MAIN FLASH CACHE TO ONE OF THE SPARE FLASH DRIVES THAT ONLY STORES THE CLEAN USER DATA, WHEREIN THE MAIN FLASH CACHE IS CONFIGURED AS ONE OR MORE PAIRS OF FLASH DRIVES AND THE ONE OF THE SPARE FLASH DRIVES IS ALLOCATED AS SINGLE DRIVE TO SECONDARY FLASH CACHE

RELATED APPLICATIONS

This application claims benefit of the priority of Chinese Patent Application Number CN201710250534.3, filed on Apr. 17, 2017 at the State Intellectual Property Office, China, titled "METHOD, APPARATUS AND COMPUTER READABLE MEDIUM FOR BUILDING MULTI-TIER FLASH CACHE BY USING HOT-SPARE FLASH DRIVES", the disclosure of which is hereby incorporated herein by reference in its entirety.

FIELD

Embodiments of the present disclosure generally relate to data storage, and more specifically, to a method, apparatus and computer-readable medium for building a multi-tier flash cache by using spare drives.

BACKGROUND

In a traditional disk array, there are generally two kinds of cache in the block layer, namely, Dynamic Random-Access Memory (DRAM) cache and Solid-State Disk (SSD) cache. The DRAM cache has the quickest response to data requests; however it is restricted in costs and cache capacity. The SSD cache responds slower to data requests than the DRAM cache, and has relatively lower cost and higher cache capacity than DRAM. The HDD disk is typically used to store all user data, and it responds to I/O requests that cannot be responded to by the DRAM cache and the SSD cache. The HDD disk has the slowest response time, open largest capacity, and lowest cost per gigabyte (GB).

In the traditional disk array, depending on the RAID type of a RAID group, a hard disk manager reserves one or more disks as a spare disk. These spare disks are prepared to replace a disk in the RAID group when the disk fails. Most of the time, these spare disks are not used. However, it is very wasteful to leave expensive SSDs idle.

SUMMARY

Embodiments of the present disclosure provide a solution for establishing a multi-tier flash cache using spare drives. In a first aspect to the present disclosure, there is provided a computer-implemented method. The method comprises: in response to receiving an I/O request, determining whether there is a free page in a main cache of cache; in response to determining that there is no free page in the main cache, establishing a secondary cache by selecting at least one spare drive from spare drives in a storage pool; flushing data from a cold page in the main cache to the secondary cache, an access frequency of the cold page being lower than a predetermined threshold; and writing data related to the I/O request from a persistent storage device to the cold page.

In a second aspect of the present disclosure, there is provided an electronic apparatus. The apparatus comprises: at least one processor; and a memory coupled to the at least one processor and comprising instructions stored thereon, wherein the instructions, when executed by the at least one processor, cause the apparatus to perform acts including: in response to receiving an I/O request, determining whether there is a free page in a main cache of cache; in response to determining that there is no free page in the main cache, establishing a secondary cache by selecting at least one spare drive from spare drives in a storage pool; flushing data from a cold page in the main cache to the secondary cache, an access frequency of the cold page being lower than a predetermined threshold; and writing data related to the I/O request from a persistent storage device to the cold page.

In a third aspect of the present disclosure, there is provided a computer-readable medium having instructions stored with thereon which, when executed by at least one processing unit, causing the at least processing unit to be configured to execute a method comprising: in response to receiving an I/O request, determining whether there is a free page in a main cache of cache; in response to determining that there is no free page in the main cache, establishing a secondary cache by selecting at least one spare drive from spare drives in a storage pool; flushing data from a cold page in the main cache to the secondary cache, an access frequency of the cold page being lower than a predetermined threshold; and writing data related to the I/O request from a persistent storage device to the cold page.

The Summary is provided to introduce selected concepts of the present disclosure, which will be further explained in the following detailed description of their various embodiments. The Summary is not intended to identify key or vital features of the present disclosure, or limit the scope of the present disclosure.

BRIEF DESCRIPTION OF THE DRAWINGS

Through the following detailed description with reference to the accompanying drawings, the above and other objectives, features, and advantages of various embodiments of the present disclosure will become more apparent. In the drawings, the various embodiments of the present disclosure will be illustrated by way of example but not limitation, in which.

In the drawings, the same or corresponding reference numerals refer to the same or corresponding blocks or elements.

DETAILED DESCRIPTION OF EMBODIMENTS

In the following text, each exemplary embodiment of the present disclosure will be described with reference to the drawings. It should be noted that the drawings and description relate to exemplary embodiments only. It is pointed out that alternative embodiments of the structure and method disclosed herein can be easily contemplated based on the following description, and the alternative embodiments can be utilized without deviating from the principles protected by the present disclosure.

It should be appreciated that the exemplary embodiments are merely to enable those skilled in the art to better understand and further implement the present disclosure and are not intended for limiting the scope of the present disclosure in any manner.

As used herein, the term "comprises" and similar terms are to be read as open-ended terms, i.e., "comprises, but is not limited to." The term "based on" is to be read as "based at least in part on." The term "one example embodiment" is to be read as "at least one example embodiment." The term "a further embodiment" is to be read as "at least one further embodiment." Related definitions of other terms will be provided in the following description.

In a disk array, there are generally two kinds of cache in the block layer, namely Dynamic Random-Access Memory (DRAM) cache and Solid-State Disk (SSD) cache. The advantage of DRAM is that requests for data can be responded to quickly, for example, typically around 60 μs. However, DRAM cache costs are high, and there are certain hardware limitations in the DRAM cache capacity. The SSD cache has a speed of response to requests for data that is slower than that of the DRAM cache, and is typically 1 ms, for example. Depending on the type technology (e.g., SLC, MLC, TLC), the SSD cache has a relatively low cost compared to DRAM. Meanwhile, in terms of cache capacity, the SSD cache is usually higher than the DRAM cache. SSDs can have, for example, the following types: HE SSD, ME SSD, and LE SSD. Different types of SSDs have different characteristics, for example, HE SSDs have the highest number of writes per day (WPD) of up to 30 WPD, whereas LE SSDs have less than 5 WPD durability.

In addition, HDD disks are typically used to store all user data and respond to I/O request that cannot be responded to by the DRAM cache and the SSD cache. An HDD disk has the slowest response time, largest capacity, and lowest cost per gigabyte (GB).

Figure 1:
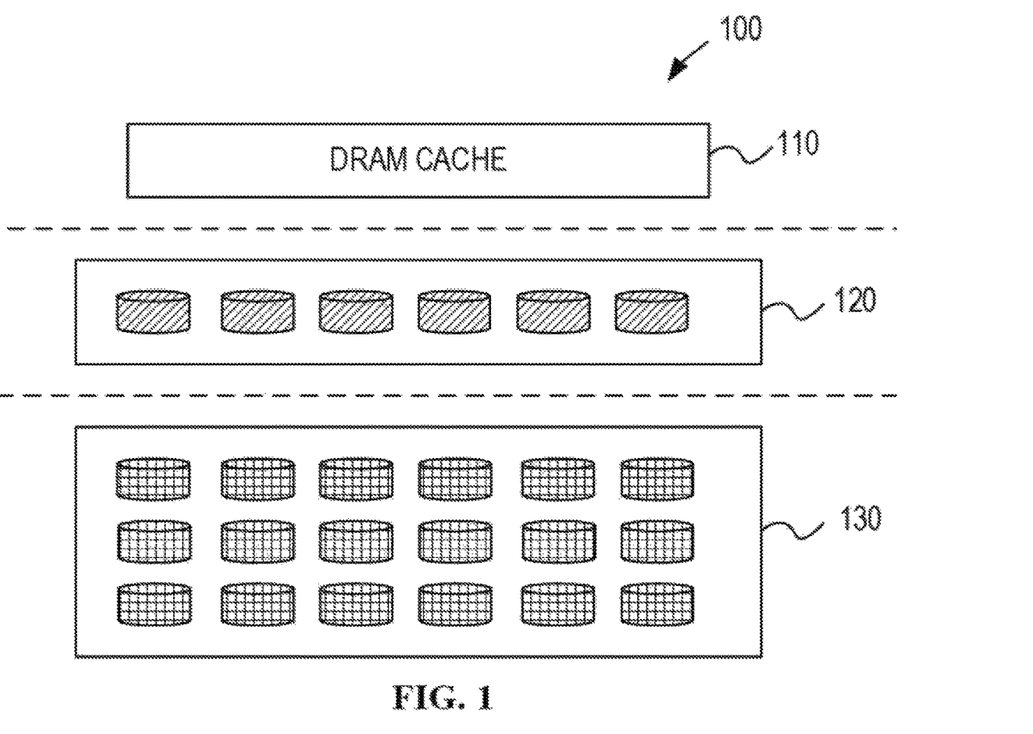
FIG. 1 illustrates a schematic diagram of a traditional cache layer in a disk array.

FIG. 1 illustrates a schematic diagram of a traditional cache 100 in a disk array. The traditional cache 100 normally comprises a DRAM cache 110, an SSD cache 120, and a Hard Disk Drive (HDD) array 130. As shown in FIG. 1, the DRAM cache 110 is positioned at the top of the 10 data path, and the SSD cache 120 is below the DRAM cache 110, while the HDD array 130 is under the SSD cache 120. When the disk array receives a host I/O request, there are two possible types of cache hits: the first one is a DRAM cache 110 hit, that is, the DRAM cache 110 first searches its cached data; and, if the search of the data in the DRAM cache 110 is hit, the DRAM cache 110 will, for example, use that data to respond the host request. The second one is an SSD cache 120 hit, that is, if no corresponding data is found in the DRAM cache 110, then the DRAM cache 110 forwards the I/O request to the SSD cache 120, which searches its own cached data after receiving the forwarded I/O request. If the search of the SSD cache 120 is hit, the SSD cache 120 will, for example, use that data to respond the host request. If no corresponding data is found in the SSD cache 120, then the I/O request is forwarded by the SSD cache 120 to the HDD array 130.

Figure 2:
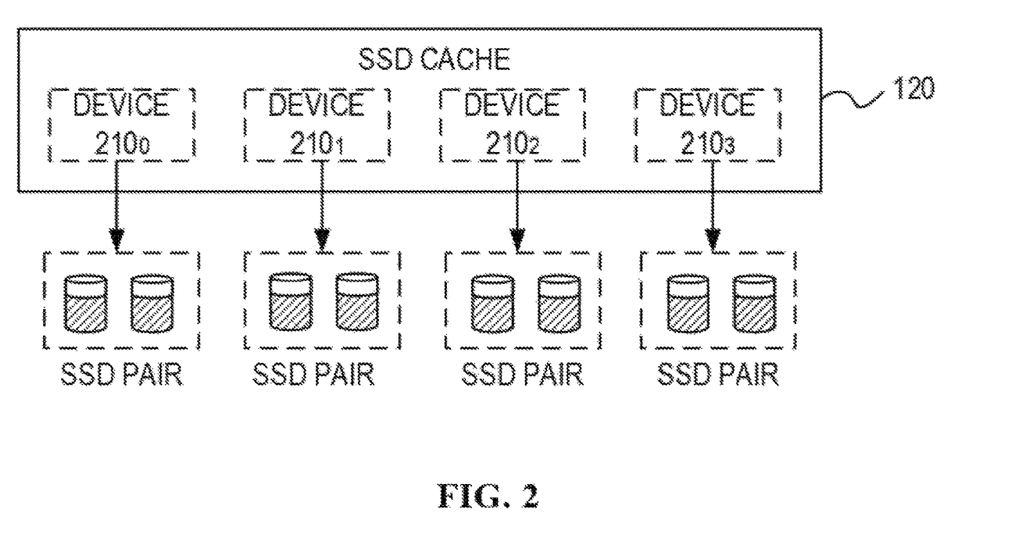
FIG. 2 illustrates a schematic diagram of an embodiment of a traditional flash cache.

FIG. 2 illustrates a schematic diagram of an embodiment of a traditional SSD cache. In the traditional SSD cache, the SSD cache 120 is designed as a read/write cache. To provide a higher reliability, each SSD device consists of a pair of SSD disks. For the sake of clarity, the reference numeral 120 representing the cache SSD in FIG. 1 is also used in FIG. 2. As shown in FIG. 2, the SSD cache 120 comprises a cache device $210_0$, a cache device $210_1$, a cache device $210_2$, and a cache device $210_3$. The cache devices each consists of a pair of SSD disks, wherein each pair of SSD disks is formed as a RAID 1 group, which ensures that no data is lost when an SSD disk is offline or damaged. Each cache device is divided into a metadata logic unit and a user data logic unit. In FIG. 2, the portion of each pair of SSDs schematically identified by slashes corresponds to a user data logic unit, and the portion of each pair of SSDs not identified by slashes corresponds to a metadata logical unit.

SSD disk technology typically needs to support over 25 writes per day. Therefore, if ME SSD technology is used to implement a fast cache, about 50% of the cache space must typically be reserved to satisfy user demand. However, such a requirement can waste cache space and increase user costs, especially when most host I/O requests are read I/O requests.

Further, in the prior art, a hard disk manager will typically reserve one or more disks as spare drives depending on the type of RAID used in the RAID groups. These spare drives are prepared for replacing a disk in a RAID group when the disk fails. Most of the time, these spare drives are not used. However, it can be very costly to waste expensive ME/LE/RI types of SSD disks.

Accordingly, a solution that can effectively improve the utilization of spare disks and system efficiency is needed.

Figure 3:
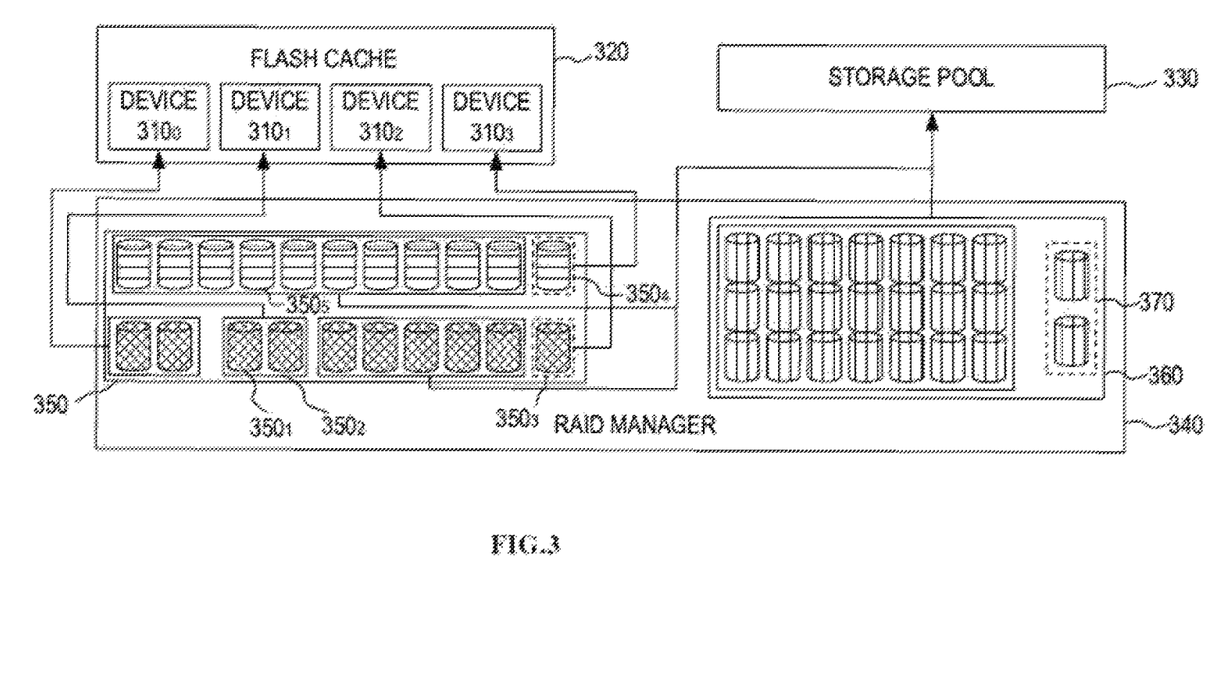
FIG. 3 illustrates a schematic diagram of an overall cache architecture according to embodiments of the present invention.

FIG. 3 illustrates a schematic diagram of an overall cache architecture according to embodiments of the present invention. As shown in FIG. 3, the RAID manager 340 comprises an SSD cache 350 and an HDD 360. The HDD 360 also comprises an HDD spare drive 370. In the SSD cache 350, two different types of SSD disks are shown. One is an HE/ME type SSD disk and the other is an LE type SSD disk. In FIG. 3, a cylinder filled with diamond lattices represents an HE/ME type SSD disk, and the cylinder filled with horizontal lines represents an LE type SSD disk. Although not illustrated in the drawing, an RI (read intensive) type SSD cache may also be included in the SSD cache. The HE/ME type SSD disk has a higher number of writable times than the LE and RI type SSD disks, and the LE type SSD disk has a higher number of writable times than the RI type SSD disk.

As described above, the SSD cache 350 usually consists of a pair of SSD disks, which is called a SSD device. For example, the SSD pair 3502 in FIG. 3 consists of two individual SSD disks $350_1$. It can be seen that in the HE/ME type of SSD disks, there are two pairs of SSD pairs which respectively form the device $310_0$ and device $310_1$ in the flash cache 320. In one embodiment of the present disclosure, device $310_0$ and device $310_1$ formed by the two SSD pairs, respectively, are referred to as main caches.

It should be understood that although only two main cache devices are shown in FIG. 3, which are for illustrative purposes only and not for the limitation of the number of the main cache devices. Without deviating from the concept of the present disclosure, any number of main cache devices may exist. There are corresponding types of spare disks in the HE/ME and LE types of SSD disks. The spare disks of the HE/ME and LE type SSD disks are identified by dotted boxes in FIG. 3. It can be seen that the device $310_1$ in the flash cache 320 is formed by the HE/ME type of spare drives $350_1$ and the device $310_2$ in the flash cache 320 is formed by the LE type of spare drives $350_4$. In one embodiment of the present disclosure, the cache devices formed by the spare drive of HE/ME and LE types of SSD disks, respectively, that is, device $310_2$ and device $310_m$, are referred to as secondary cache.

It should be noted that although device $310_2$ and device $310_3$ are both secondary cache, they are not established at the same time due to the different types of SSDs forming the device $310_2$ and the device $310_3$. When the capacity of the main cache is insufficient, the spare disk of the type of SSD disk with the highest number of possible writes is used as the first tier to establish the secondary cache, and the spare disk of the type of SSD disk with the second-highest number of possible writes is used as the second tier to establish the secondary cache, and so on. That is, the secondary cache is established hierarchically.

It should be noted that the main cache is a cache that supports a read/write cache. In order to enable the spare drives that act as secondary cache to be available at any time by the lower hard disk management layer, the secondary cache consisting of the spare drives has only read functionality. Accordingly, the secondary cache can cache clean user data, and it is not necessary to flush the data to the hard disk when the data is removed. Thus, the spare drives can be quickly released when the lower hard disk management needs them. For example, in FIG. 3, if an SSD disk in the resource pool 330 fails, a spare disk of the same type as the failed disk will be immediately released to replace the failed disk. Unlike the main cache, which is generally an R1 RAID group, the secondary cache consists of ME/LE/RI forming an R0 RAID group, which provides hot user data with a larger cache capacity than the main cache.

In addition to being different from the main cache in terms of cache composition, the memory management allocated for the secondary cache is also different. In order to be able to quickly release the resources allocated to the secondary cache, the resources are individually allocated to each device in the secondary cache, and a hash index is established for each device in the secondary device.

Figure 4:
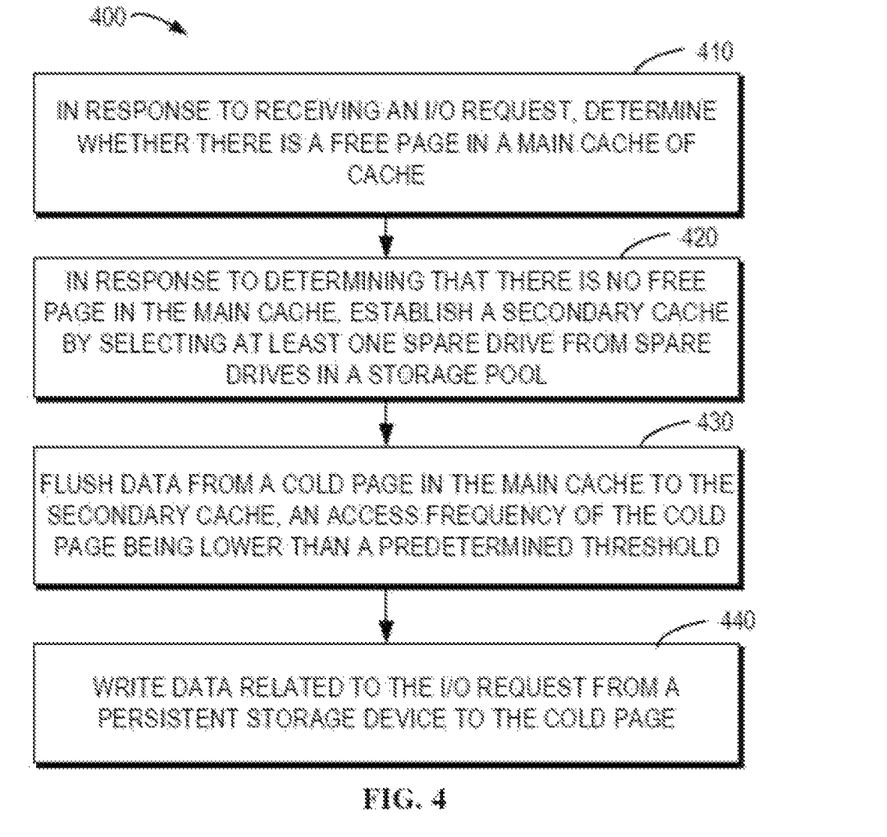
FIG. 4 illustrates a flowchart of a method for establishing a multi-tier flash cache according to embodiments of the present disclosure.
Figure 5:
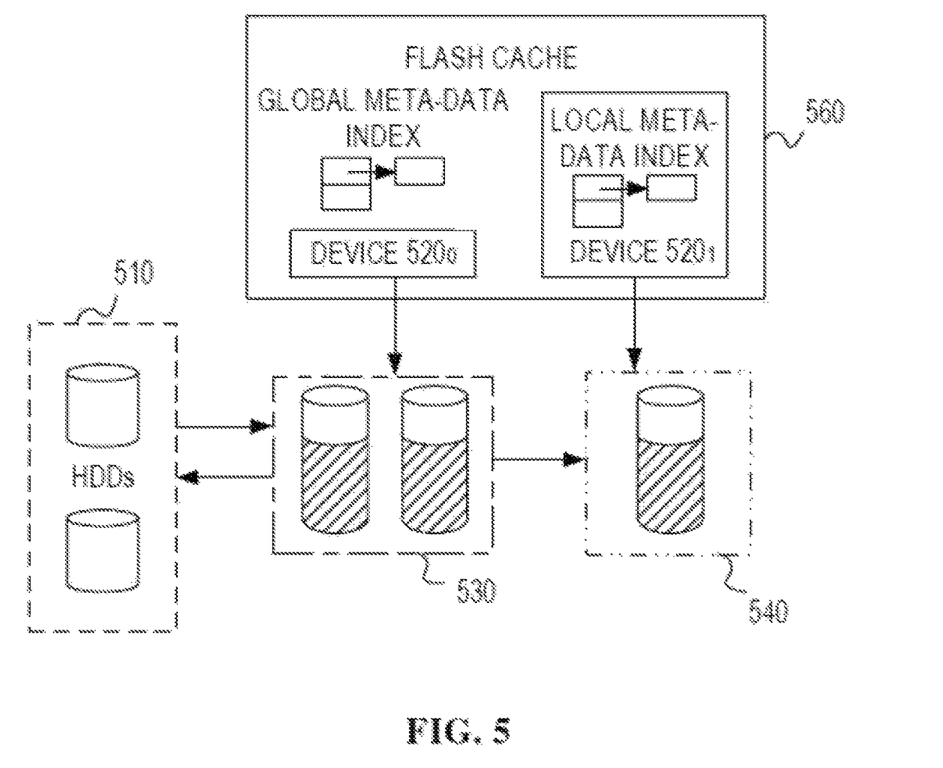
FIG. 5 shows a schematic diagram of establishing a first tier in a secondary cache according to embodiments of the present disclosure.
Figure 6:
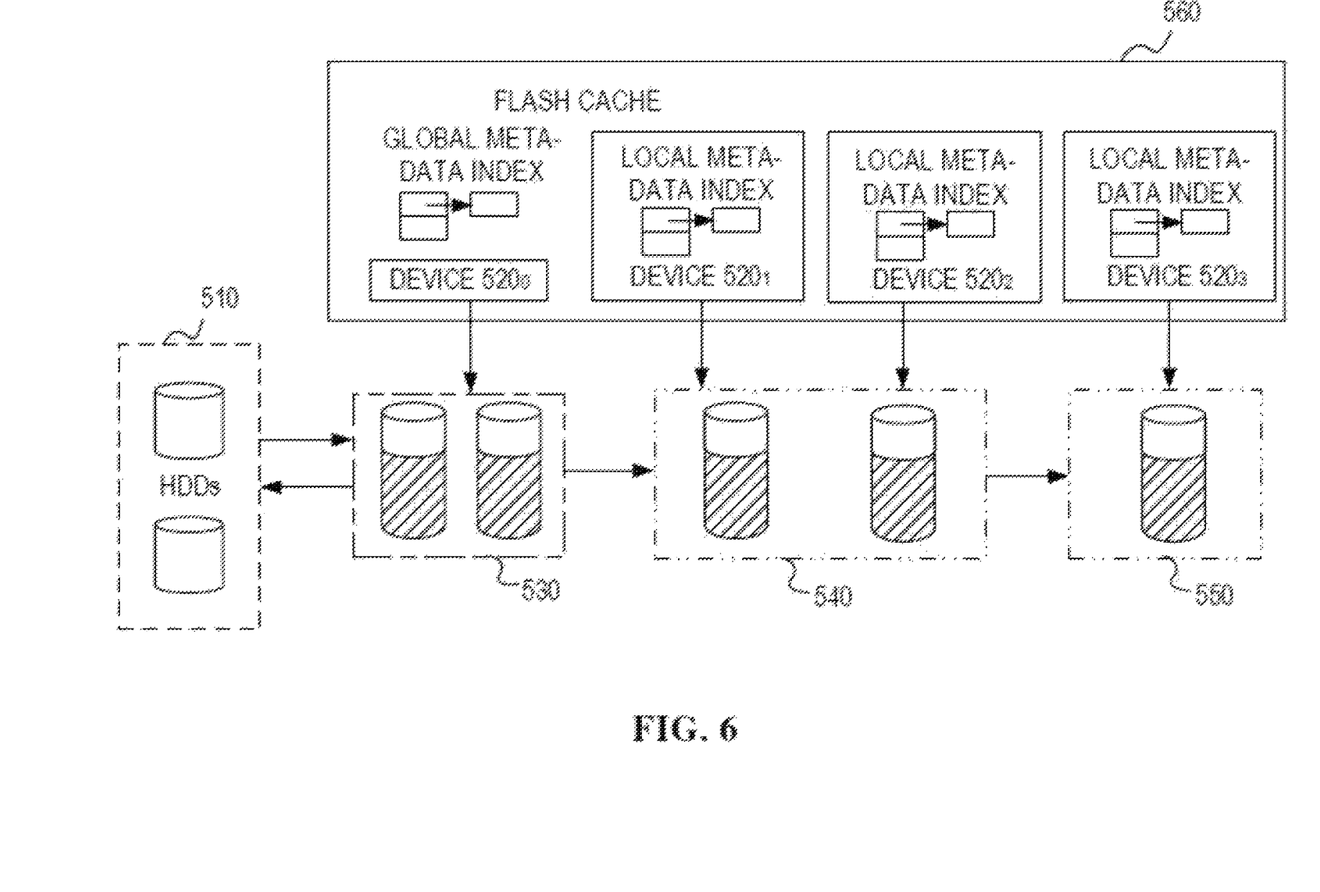
FIG. 6 demonstrates a schematic diagram of cache architecture for establishing the multi-tier flash cache according to embodiments of the present disclosure.

FIG. 4 illustrates a flowchart of a method 400 to establish a multi-tier flash cache according to embodiments of the present disclosure. FIG. 5 shows a schematic diagram of establishing the first tier in the secondary cache according to the embodiments of the present disclosure. FIG. 6 shows a schematic diagram of cache architecture for establishing the multi-tier flash cache according to embodiments of the present disclosure. The method 400 of FIG. 4 to establish a multi-tier flash cache according to embodiments of the present disclosure will be further described with reference to FIGS. 5 to 6.

According to general guidelines, hot user data (the most frequently accessed user data) will be promoted from HDD to the read-write cache. For example, in FIGS. 5 and 6, the hot user data in an HDD array 510 is promoted to the main cache device $520_0$, which illustratively consist of a pair of SSD disks 530. It should be understood that the main cache can comprise a plurality of pairs of SSD disks. In the case of a cache hit, the user data will be written into the free pages of the main cache device $520_0$.

As shown in FIG. 4, at 410, if an I/O request of the host is received, it is determined whether there is a free page in the main cache device $520_0$ in the cache 560. As the system runs, new user data is continuously written into the main cache device $520_0$, and the number of free pages in the main cache device $520_0$ decreases. In the prior art, a page (cold page), in which the access frequency in the read-write cache is less than a predetermined threshold, is generally evicted to the HDD array. However, repeated promotion and eviction actions reduce the service life of the read-write cache.

Therefore, according to one embodiment of the present disclosure, at 420, if it is determined that there is no free page in the main cache device $520_0$, at least one spare drive is selected to establish the secondary cache. It can be understood that the spare drive can be any one of the spare drive $350_3$ of the HE/ME type of SSD, the spare drive $350_4$ of the LE type of SSD, and the spare drive of the RI type of SSD (not shown). In view of the durability of SSD disks, when a spare drive is selected to establish the secondary cache, first select at least one of the SSD spare disks having a number of possible writes per unit of time exceeding a predetermined threshold, for example, having the highest number of possible writes, to establish the first tier of the secondary cache.

It should be appreciated that the number of writes per unit of time may be, for example, the number of writes per day (WPD). For example, the spare drive $350_3$ of the HE/ME type of SSD in FIG. 3 can be selected to establish the secondary cache device $520_1$ of FIG. 5, which comprises one HE/ME type of SSD disk 540. Although FIG. 3 only schematically illustrates a spare drive $350_3$ of the HE/ME type of SSD, it should be appreciated that if there are multiple SSD spare disks of the same type, multiple spare disks may be selected to establish a secondary cache. The secondary cache devices established by the same type of SSD spare disk are at the same tier. For example, in FIG. 6, the first tier of the secondary cache comprises two secondary cache devices $520_1$ and $520_2$.

It should be noted that unlike the main cache, which only has one global metadata index, the devices in the secondary cache are each allocated with respective storage space that is used to establish their respective metadata index. For example, in the disk 540 of FIG. 5, the portion not identified by hash marks represents the metadata logic unit, and the portion identified by the hash marks represents the user data logic unit. It should be noted that other disks in the flash cache layer of FIG. 5, and portions of the metadata logic unit of each disk in FIG. 6 to FIG. 8 to be described below, will be identified in the same manner. The user data logic unit is omitted for the sake of brevity in other descriptions provided herein.

Once the secondary cache is established, at 430, the data of the cold page evicted from the main cache device $520_0$ is flushed to the secondary cache device $520_1$. At 440, the data related to the I/O request, that is, the hot user data described above, is written from the persistent storage device, such as the HDD, to the cold page in the main cache.

Subsequently, the same type of SSD spare disk may not exist in the storage pool. For example, in FIG. 3, the spare disk corresponding to the spare drive $350_3$ of the HE/ME type of SSD may already be used to establish the first tier in the secondary cache device, and there may be no other spare disk of the same type in the storage pool. Further, if there is no available capacity in the established cache disk at this tier, then at least one of the SSD spare disks of the type having the next highest number of possible writes, for example, the number of possible writes per unit of time is equal to a predetermined threshold, is selected to establish the next tier of the secondary cache. For example, the spare disk $350_4$ of the LE type of SSD in FIG. 3 can be selected to establish the secondary cache device $520_2$ of FIG. 6, and the secondary cache device $520_2$ can comprise an LE type of SSD disk 550. Despite the difference in the type of SSD spare drive used to establish the first tier of the secondary cache device, the establishing procedure is identical for each device at the first tier, and therefore is not described here. It should be understood that the secondary cache device $520_2$ is also allocated with a separate storage space for establishing its metadata index.

Figure 7:
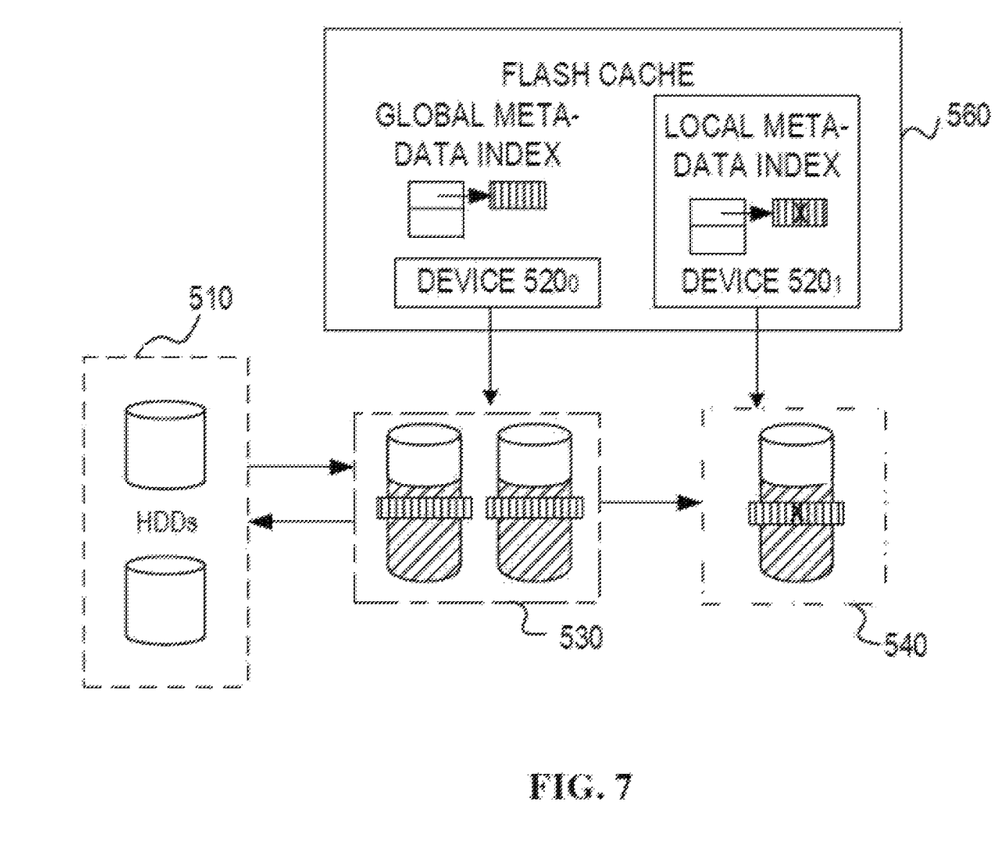
FIG. 7 is a schematic diagram illustrating a write cache hit on the secondary cache according to embodiments of the present disclosure.

Following the above method, the multi-tier secondary cache device is established tier by tier using different types of SSD spare drives. When the flash cache layer 560 in FIGS. 5 and 6 receives an I/O request, a page related to the requested data is first searched in the global metadata index of the main cache device. If no corresponding page is found, the metadata indexes in the secondary cache devices are searched tier by tier. FIG. 7 illustrates a schematic diagram of a write cache hit on the secondary cache according to the embodiments of the present disclosure. According to one embodiment of the present disclosure, if the cache page in the secondary cache device is hit, the flash cache layer will allocate new pages in the main cache device to write the data related to the above I/O request into new pages allocated in the main cache device while the original pages in the secondary cache device will be released. As shown in FIG. 7, when the cache page in the secondary cache device $520_1$ (indicated by a box marked with vertical hash marks) is hit, data of the hit page is written into a pair of SSD disks 530 of the main cache device $520_0$. Further, the original pages in the disk 540 of the secondary cache device $520_1$ are released (the released page is represented by a symbol "X").

Figure 8:
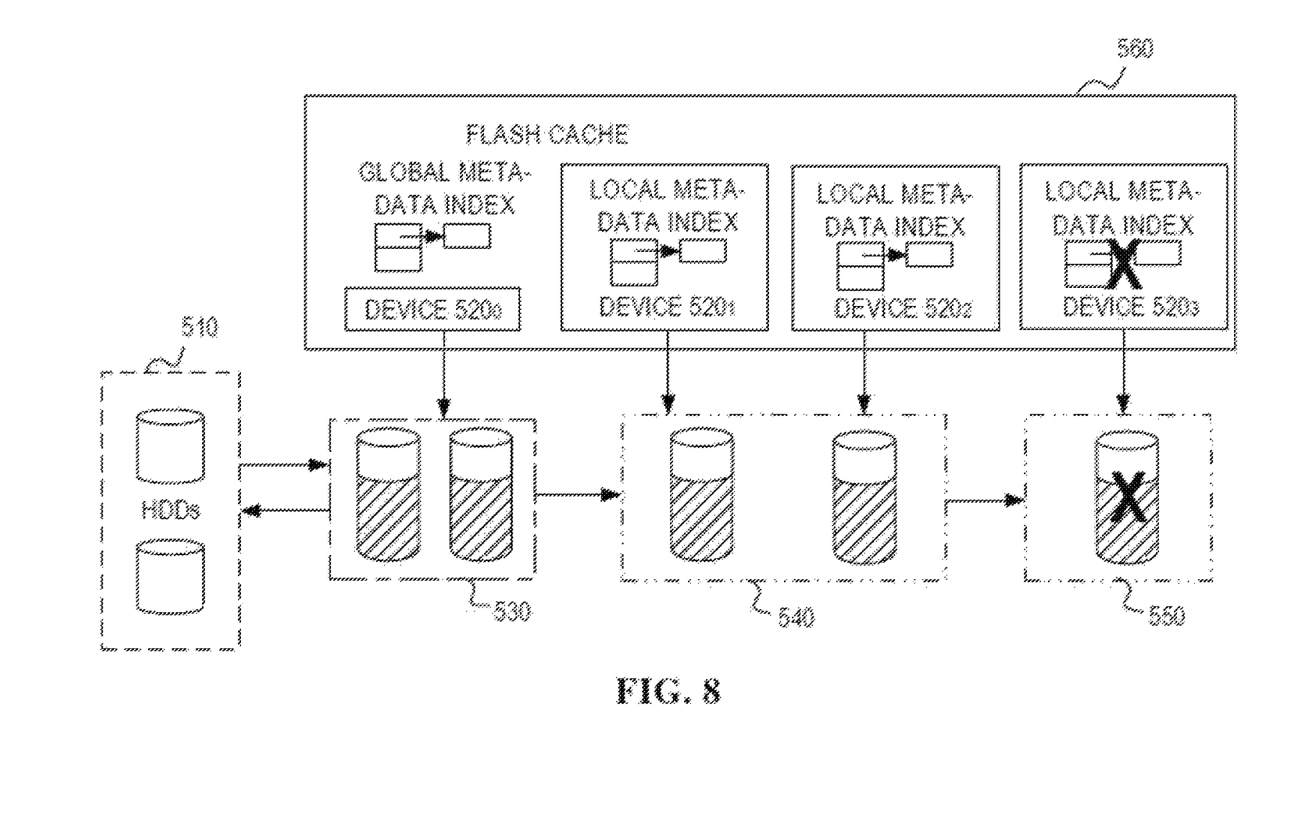
FIG. 8 is a schematic diagram illustrating the removal of one cache device from the secondary cache according to embodiments of the present disclosure.

When the lower disk management layer needs a spare disk to replace a failed SSD disk in the storage pool and there is no available spare disk (that is, the corresponding type of spare disk is already used to establish a secondary cache device), it shall notify the flash cache layer to release the required type of secondary cache device. FIG. 8 is a schematic diagram illustrating the removal of one cache device from the secondary cache according to the embodiments of the present disclosure. As shown in FIG. 8, according to one embodiment, the lower hard disk management layer first marks the metadata logic unit of the secondary device $520_3$ as unavailable. Once the flash cache layer 320 notices that the metadata logic unit of the secondary cache device $520_3$ is unavailable, the unavailable secondary cache device $520_3$ is removed from the secondary cache device. According to one embodiment of the present disclosure, the storage space allocated for the secondary cache device $520_3$ is first released, and then the user data logic unit established on the secondary cache device $520_3$ is removed. When the lower hard disk management layer notices that all of the logic units established on the cache device have been removed, the released cache device is used to replace the failed SSD disk. Because according to the solution of the present disclosure, the secondary cache can only cache clean user data, it is not necessary to flush them to the hard disk when these data are removed. Therefore, the cache device can be quickly released when the lower hard disk management needs them.

During a system restart due to a failure, the cache layer will load the database that was recorded in the cache configuration to set up the cache. The database records the metadata logic unit, the user data logic unit, the cache device of the main cache, and the cache device of the secondary cache. The difference between the main cache and the secondary cache is the number of disks included in their cache devices. One cache device in the main cache comprises two disks while one cache device in the secondary cache only comprises one disk. When the cache layer attempts to set up one cache device on the secondary cache, the cache layer will ignore the cache device if the disks thereon are unavailable. Afterwards, the cache layer will remove the corresponding record of the cache device from the database.

Cache devices in the cache may also fail during normal system operation. The hardware management layer notices this failure first and informs the cache layer. When the cache layer receives an indication that the cache device subordinate to the cache layer has failed, the failed cache device is immediately removed from the secondary cache. The storage space allocated for the failed cache device is first released and the user data logic unit and the metadata logic unit established on the cache device are then removed. Finally, the cache layer will remove the corresponding record for the cache device from the database. When the failed disk is recovered, the hard disk management layer reuses it as a hot spare disk.

Figure 9:
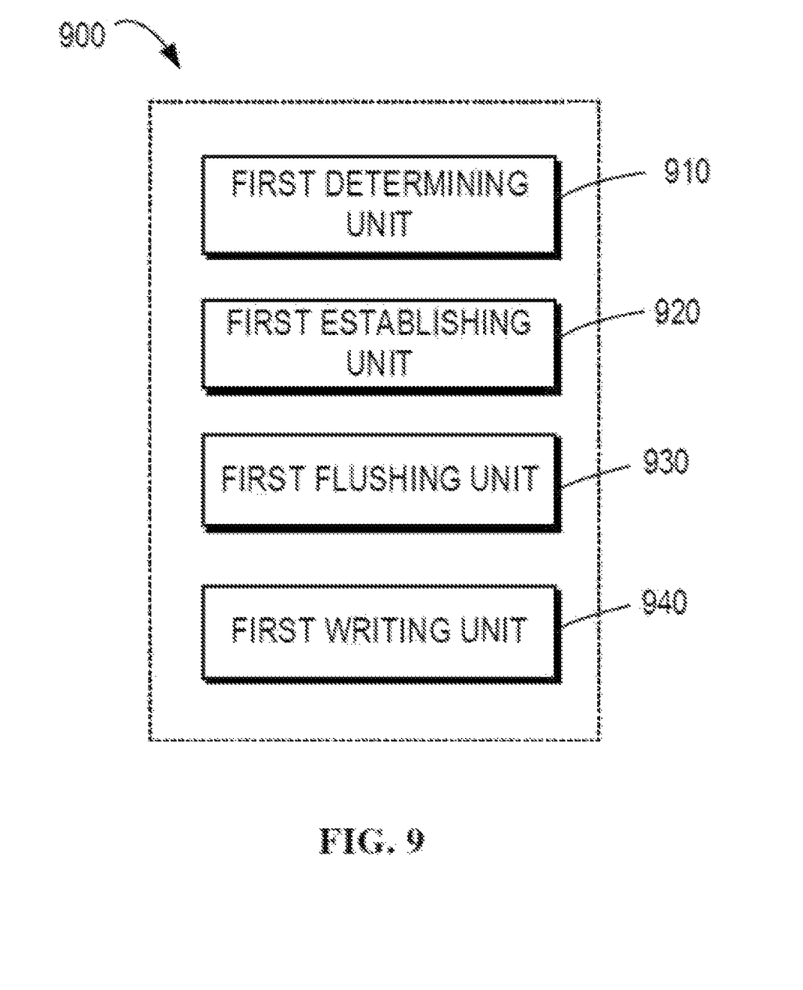
FIG. 9 illustrates a block diagram of a device for establishing a multi-tier flash cache according to embodiments of the present disclosure.

FIG. 9 illustrates a block diagram of a device 900 for establishing a multi-tier flash cache according to embodiments of the present disclosure. The apparatus 900, for example, can implement the method 400 shown in FIG. 4. According to FIG. 9, the apparatus 900 can comprise a first determination unit 910 configured to, in response to receiving an I/O request, determine whether there is a free page in a main cache. The apparatus 900 can also comprise a first establishment unit 920 configured to, in response to determining that there is no free page in the main cache, establish a secondary cache by selecting at least one spare drive from a plurality of spare drives in a storage pool. The apparatus 900 can further comprise a first flushing unit 930 configured to flush data from a cold page in the main cache to the secondary cache, in which an access frequency of the cold page is lower than a predetermined threshold. Further, the apparatus 900 can comprise a first write unit 940 configured to write data related to the I/O request from a persistent storage device to the cold page.

For purposes of clarity, FIG. 9 does not illustrate some optional modules of the device 900. However, it should be understood that various features described above by FIGS. 3-8 are also applicable to the device 900. Besides, the various modules of the device 900 can be hardware modules as well as software modules. For example, in some embodiments, the device 900 can be implemented partially or fully by software and/or firmware, such as being implemented as a computer program product included on a computer-readable medium. Alternatively or additionally, the device 900 can be implemented fully or partially based on hardware, such as implemented as an integrated circuit (IC), application-specific integrated circuit (ASIC), system-on-chip (SOC), field programmable gate array (FPGA), and the like. The scope of the present disclosure is not restricted in this regard.

Figure 10:
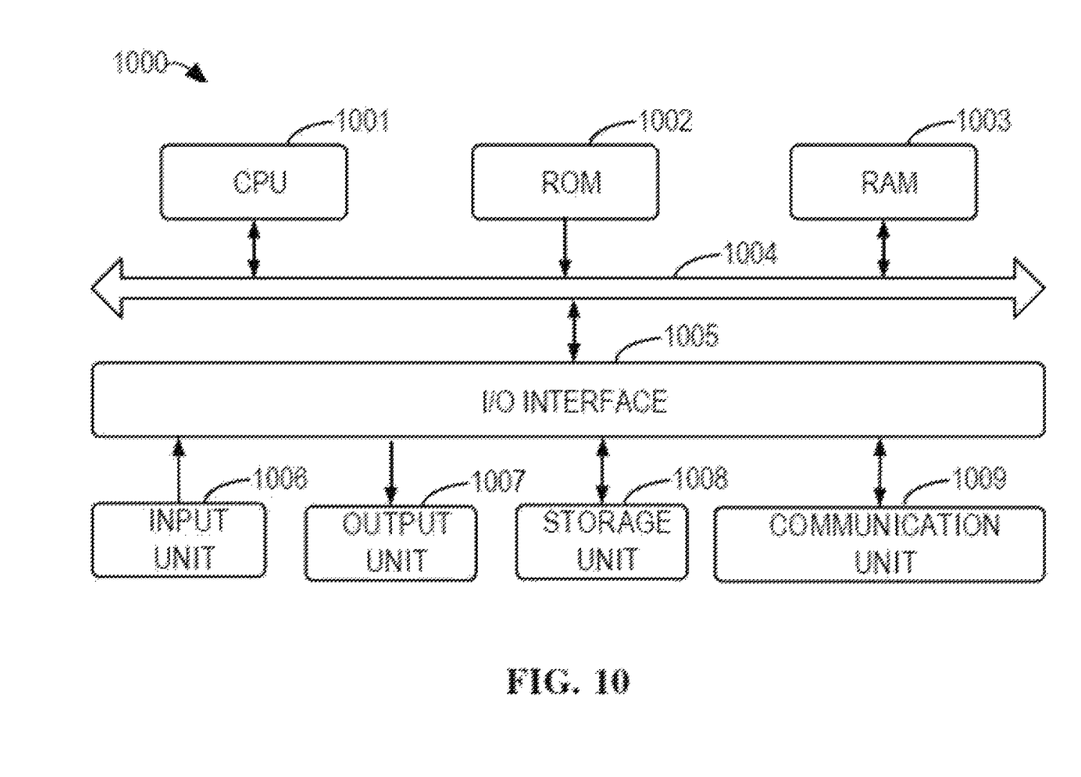
FIG. 10 illustrates a block diagram of an apparatus suitable for implementing embodiments of the present disclosure.

FIG. 10 illustrates a schematic block diagram of a device 1000 for implementing embodiments of the present disclosure. As shown in FIG. 10, the device 1000 comprises a central process unit (CPU) 1001, which can execute various suitable actions and processing based on computer program instructions stored in a read-only memory (ROM) 1002, or computer program instructions loaded in a random-access memory (RAM) 1003. The RAM 1003 can also store all kinds of programs and data required by the operation of the device 1000. CPU 1001, ROM 1002, and RAM 1003 are connected to each other via a bus 1004. An input/output (I/O) interface 1005 is also connected to the bus 1004.

A plurality of components in the device 1000 are connected to the I/O interface 1005, including: an input unit 1006, such as a keyboard, mouse, and the like; an output unit 1007, e.g., various kinds of displays and loudspeakers, etc.; a storage unit 1008, such as a disk and optical disk, etc.; and, a communication unit 1009, such as a network card, modem, wireless transceiver, and the like. The communication unit 1009 allows the device 1000 to exchange information/data with other devices via a computer network, such as the Internet, and/or various telecommunication networks.

The above described procedure and processing, such as the method 400, can be executed by the processing unit 1001. For example, in some embodiments, the method 400 can be implemented as a computer software program tangibly included in the machine-readable medium, e.g., the storage unit 1008. In some embodiments, the computer program can be partially or fully loaded and/or mounted to the apparatus 1000 via the ROM 1002 and/or the communication unit 1009. When the computer program is loaded to the RAM 1003 and executed by the CPU 1001, one or more actions of the above described method 400 can be implemented.

In conclusion, the embodiments of the present disclosure provide a method for establishing a multi-tier flash cache using spare drives. Compared with the prior art, embodiments of the present disclosure can employ all types of spare drives to establish the secondary cache, so that the spare drives are utilized more effectively. In this way, the cache can be provided with more cache capacity. In addition, it is possible to reduce write I/O requests caused by promoting a page flushed to the hard disk back to the flash disk, so it is possible to extend the service life of the flash disk in the main cache.

The present disclosure can be a method, a device, and/or a computer program product. The computer program product can comprise a computer-readable storage medium loaded with computer-readable program instructions thereon for executing various aspects of the present disclosure.

The computer-readable storage medium can be a tangible device capable of maintaining and storing instructions used by the instruction executing devices. The computer-readable storage medium may include, but is not limited to, for example, an electrical storage device, a magnetic storage device, an optical storage device, an electromagnetic storage device, a semiconductor storage device, or any suitable combination of the above. More specific examples (non-exhaustive list) of the computer-readable storage medium comprises the following: a portable storage disk, a hard disk, a random-access memory (RAM), a read-only memory (ROM), an erasable programmable read-only memory (EPROM or flash), a static random-access memory (SRAM), a portable compact disk read-only memory (CD-ROM), a digital versatile disk (DVD), a memory stick, floppy disk, a mechanic coding device, e.g., a punched card or embossment within a groove stored with instructions thereon, and any suitable combination of the above. The computer-readable storage medium used herein is not interpreted as a transient signal per se, e.g., radio waves or freely propagated electromagnetic waves, electromagnetic waves propagated via a waveguide or other transmission medium (e.g., optical pulse through a optic fiber cable), or electric signals transmitted through an electric wire.

Computer-readable program instructions described herein can be downloaded to respective computing/processing device from a computer readable storage medium, or to an external computer or external storage device via networks, e.g., the Internet, local area network, wide area network, and/or wireless network. The network can comprise copper transmission cables, optic fiber transmission, wireless transmission, routers, firewalls, switches, gateway computers, and/or edge servers. The network adapter card or network interface in each computing/processing device receives computer-readable program instructions from the network, and forwards the computer-readable program instructions for storage in the computer-readable storage medium within the respective computing/processing device.

Computer program instructions for carrying out operations of the present disclosure may be assembly instructions, instructions of instruction set architecture (ISA), machine instructions, machine-related instructions, microcode, firmware instructions, state setting data, or source codes or target codes written in any combination of one or more programming languages, wherein the programming languages comprise object-oriented programming languages, e.g., Smalltalk, C++ and so on, and conventional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including a local area network (LAN) and wide area network (WAN), or to the external computer (for example, via the Internet using an Internet service provider). In some embodiments, state information of the computer-readable program instructions is used to customize an electronic circuit, for example, programmable logic circuit, field programmable gate array (FPGA), or programmable logic array (PLA). The electronic circuit can execute computer-readable program instructions to implement various aspects of the present disclosure.

Various aspects of the present disclosure are described herein with reference to a flowchart and/or block diagram of a method, apparatus (device), and computer program product according to embodiments of the present disclosure. It should be understood that each block of the flowchart and/or block diagram and the combination of each block in the flowchart and/or block diagram can be implemented by computer-readable program instructions.

These computer-readable program instructions may be provided to the processor of a general-purpose computer, dedicated computer, or other programmable data processing apparatuses to produce a machine, such that the instructions, when executed by the processor of the computer or other programmable data processing apparatuses, generate an apparatus for implementing functions/actions stipulated in one or more blocks in the flowchart and/or block diagram. The computer-readable program instructions can also be stored in the computer-readable storage medium and cause the computer, programmable data processing apparatus, and/or other devices to work in a particular manner, such that the computer-readable medium stored with instructions comprises an article of manufacture, including instructions for implementing various aspects of the functions/actions as specified in one or more blocks of the flowchart and/or block diagram.

The computer-readable program instructions can also be loaded into a computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flowchart and/or block diagram.

The flowchart and block diagram in the drawings illustrate architecture, functions, and operations implemented by a method, device, and computer program product according to multiple embodiments of the present disclosure. In this regard, each block in the flowchart or block diagram can represent a module, or a part of a program segment or instruction, wherein the module or the part of program segment or instruction include one or more executable instructions for performing stipulated logic functions. In some alternative implementations, the functions indicated in the block diagram can also take place in an order different from the one indicated in the drawings. For example, two successive blocks may, in fact, be executed in parallel or in a reverse order dependent on the involved functions. It should also be noted that each block in the block diagram and/or flowchart and combinations of the blocks in the block diagram and/or flowchart can be implemented by a hardware-based system dedicated for executing stipulated functions or actions, or by a combination of dedicated hardware and computer instructions.

The descriptions of various embodiments of the present disclosure have been provided above, and the above descriptions are only exemplary rather than exhaustive and are not limited to the embodiments of the present disclosure. Many modifications and alterations, without deviating from the scope and spirit of the various embodiments described above, may be implemented by those skilled in the art. The selection of technical terms in the text aims to best explain principles and actual applications of each embodiment and technical improvements made in the market by each embodiment, or enable those of ordinary skill in the art to understand the embodiments disclosed herein.

We claim:

1. A computer-implemented method, comprising:
receiving an I/O request;
determining that there is no free page in a main flash cache, the main flash cache including a page containing user data that has an access frequency lower than a predetermined threshold frequency, the page containing the user data being referred to as a cold page, the user data contained in the cold page being referred to as clean user data, wherein the main flash cache is configured as one or more pairs of flash drives;
in response to determining that there is no free page in the main flash cache, establishing a secondary flash cache by selecting a spare flash drive from among a plurality of spare flash drives in a storage pool, wherein the spare flash drive is allocated to the secondary flash cache as a single drive;
flushing the clean user data from the cold page of the main flash cache to the selected spare flash drive of the secondary flash cache, the secondary flash cache caching storing only the clean user data;
receiving a request to replace a failed drive in a RAID group;
determining that there is no spare flash drive in the storage pool available for use to replace the failed drive in the RAID group;
in response to determining that there is no spare flash drive in the storage pool available for use to replace the failed drive in the RAID group, releasing the selected spare flash drive without flushing the clean user data to a persistent storage device, the released spare flash drive having a same technology type as the failed drive to be replaced;
and replacing the failed drive in the RAID group with the released spare flash drive.

2. The method of claim 1, wherein the secondary flash cache is a multi-tier secondary flash cache, and wherein establishing the secondary flash cache comprises:
establishing a first tier of the multi-tier secondary flash cache,
wherein establishing the first tier of the multi-tier secondary flash cache includes selecting at least one spare flash drive of a first technology type from among the plurality of spare flash drives so that a number of writes per unit time of the at least one spare flash drive of the first technology type exceeds a predetermined threshold number.

3. The method of claim 2, wherein establishing the secondary flash cache further comprises:
determining that an available capacity of the at least one spare flash drive of the first technology type is below a first threshold capacity; and
having determined that the available capacity of the at least one spare flash drive of the first technology type is below the first threshold capacity, establishing a second tier of the multi-tier secondary flash cache,
wherein establishing the second tier of the multi-tier secondary flash cache includes selecting at least one spare flash drive of a second technology type from among the plurality of spare flash drives so that the number of writes per unit time of the at least one spare flash drive of the second technology type is equal to the predetermined threshold number.

4. The method of claim 3, wherein establishing the secondary flash cache further comprises:
determining that an available capacity of the at least one spare flash drive of the second technology type is below a second threshold capacity; and
having determined that the available capacity of the at least one spare flash drive of the second technology type is below the second threshold capacity, establishing a third tier of the multi-tier secondary flash cache,
wherein establishing the third tier of the multi-tier secondary flash cache includes selecting at least one spare flash drive of a third technology type from among the plurality of spare drives so that the number of writes per unit time of the at least one spare flash drive of the third technology type is lower than the predetermined threshold number.

5. The method of claim 1, further comprising:
determining that a page in the secondary flash cache is hit by the received I/O request;
having determined that the page in the secondary flash cache is hit by the received I/O request, allocating a free page for the hit page in the main flash cache;

writing data related to the hit page into the allocated free page in the main flash cache; and releasing the hit page of the secondary flash cache.

6. The method of claim 1, wherein releasing the selected spare flash drive comprises:
   releasing a storage space allocated for the selected spare flash drive; and
   removing user data logic units of the selected spare flash drive.

7. The method of claim 3, wherein establishing the secondary flash cache further comprises:
   establishing the multi-tier secondary flash cache hierarchically such that the first tier of the multi-tier secondary flash cache is established at a first time, and the second tier of the multi-tier secondary flash cache is established at a second time, wherein the second time is different from the first time.

8. An electronic apparatus, comprising:
   at least one processor;
   and a memory coupled to the at least one processor and comprising instructions stored thereon, wherein the instructions, when executed by the at least one processor, cause the apparatus to perform acts including:
   receiving an I/O request;
   determining that there is no free page in a main flash cache, the main flash cache including a page containing user data that has an access frequency lower than a predetermined threshold frequency, the page containing the user data being referred to as a cold page, the user data contained in the cold page being referred to as clean user data, wherein the main flash cache is configured as one or more pairs of flash drives;
   in response to determining that there is no free page in the main flash cache, establishing a secondary flash cache by selecting a spare flash drive from among a plurality of spare flash drives in a storage pool, wherein the spare flash drive is allocated to the secondary flash cache as a single drive;
   flushing the clean user data from the cold page of the main flash cache to the selected spare flash drive of the secondary flash cache, the secondary flash cache storing only the clean user data;
   receiving a request to replace a failed drive in a RAID group;
   determining that there is no spare flash drive in the storage pool available for use to replace the failed drive in the RAID group;
   in response to determining that there is no spare flash drive in the storage pool available for use to replace the failed drive in the RAID group, releasing the selected spare flash drive without flushing the clean user data to a persistent storage device, the released spare flash drive having a same technology type as the failed drive to be replaced;
   and replacing the failed drive in the RAID group with the released spare flash drive.

9. The apparatus of claim 8, wherein the secondary flash cache is a multi-tier secondary flash cache, and wherein establishing the secondary flash cache comprises:
   establishing a first tier of the multi-tier secondary flash cache, wherein establishing the first tier of the multi-tier secondary flash cache includes selecting at least one spare flash drive of a first technology type from among the plurality of spare flash drives so that a number of writes per unit time of the at least one spare flash drive of the first technology type exceeds a predetermined threshold number.

10. The apparatus of claim 9, wherein establishing the secondary flash cache further comprises:
    determining that an available capacity of the at least one spare flash drive of the first technology type is below a first threshold capacity; and
    having determined that the available capacity of the at least one spare flash drive of the first technology type is below the first threshold capacity, establishing a second tier of the multi-tier secondary flash cache, wherein establishing the second tier of the multi-tier secondary flash cache includes selecting at least one spare flash drive of a second technology type from among the plurality of spare flash drives so that the number of writes per unit time of the at least one spare flash drive of the second technology type is equal to the predetermined threshold number.

11. The apparatus of claim 10, wherein establishing the secondary flash cache further comprises:
    determining that an available capacity of the at least one spare flash drive of the second technology type is below a second threshold capacity; and
    having determined that the available capacity of the at least one spare flash drive of the second technology type is below the second threshold capacity, establishing a third tier of the multi-tier secondary flash cache, wherein establishing the third tier of the multi-tier secondary flash cache includes selecting at least one spare flash drive of a third technology type from among the plurality of spare flash drives so that the number of writes per unit time of the at least one spare flash drive of the third technology type is lower than the predetermined threshold number.

12. The apparatus of claim 8, wherein the acts further include:
    determining that a page in the secondary flash cache is hit by the received I/O request;
    having determined that the page in the secondary flash cache is hit by the received I/O request, allocating a free page for the hit page in the main flash cache;
    writing data related to the hit page into the allocated free page in the main flash cache; and
    releasing the hit page of the secondary flash cache.

13. The apparatus of claim 8, wherein releasing the selected spare flash drive comprises:
    releasing a storage space allocated for the selected spare flash drive; and
    removing user data logic units of the selected spare flash drive.

14. A computer-readable storage medium having instructions stored with thereon which, when executed by at least one processing unit, causing the at least one processing unit to be configured to execute a method, the method comprising:
    determining that there is no free page in a main flash cache, the main flash cache including a page containing user data that has an access frequency lower than a predetermined threshold frequency, the page containing the user data being referred to as a cold page, the user data contained in the cold page being referred to as clean user data, wherein the main flash cache is configured as one or more pairs of flash drives;
    in response to determining that there is no free page in the main flash cache, establishing a secondary flash cache by selecting a spare flash drive from among a plurality of spare flash drives in a storage pool, wherein the spare flash drive is allocated to the secondary flash cache as a single drive;

flushing the clean user data from the cold page of the main flash cache to the selected spare flash drive of the secondary flash cache, the secondary flash cache caching storing only the clean user data;

receiving a request to replace a failed drive in a RAID group;

determining that there is no spare flash drive in the storage pool available for use to replace the failed drive in the RAID group;

in response to determining that there is no spare flash drive in the storage pool available for use to replace the failed drive in the RAID group, releasing the selected spare flash drive without flushing the clean user data to a persistent storage device, the released spare flash drive having a same technology type as the failed drive to be replaced;

and replacing the failed drive in the RAID group with the released spare flash drive.

15. The computer-readable storage medium of claim 14, wherein the secondary flash cache is a multi-tier secondary flash cache, and wherein establishing the secondary flash cache comprises:

establishing a first tier of the multi-tier secondary flash cache, wherein establishing the first tier of the multi-tier secondary flash cache includes selecting at least one spare flash drive of a first technology type from among the plurality of spare flash drives so that a number of writes per unit time of the at least one spare flash drive of the first technology type exceeds a predetermined threshold number.

16. The computer-readable storage medium of claim 15, wherein establishing the secondary flash cache further comprises:

determining that an available capacity of the at least one spare flash drive of the first technology type is below a first threshold capacity;

and having determined that the available capacity of the at least one spare flash drive of the first technology type is below the first threshold capacity, establishing a second tier of the multi-tier secondary flash cache, wherein establishing the second tier of the multi-tier secondary flash cache includes selecting at least one spare flash drive of a second technology type from among the plurality of spare flash drives so that the number of writes per unit time of the at least one spare flash drive of the second technology type is equal to the predetermined threshold number.

17. The computer-readable storage medium of claim 16, wherein establishing the secondary flash cache further comprises:

determining that an available capacity of the at least one spare flash drive of the second technology type is below a second threshold capacity;

and having determined that the available capacity of the at least one spare flash drive of the second technology type is below the second threshold capacity, establishing a third tier of the multi-tier secondary flash cache, wherein establishing the third tier of the multi-tier secondary flash cache includes selecting at least one spare flash drive of a third technology type from among the plurality of spare flash drives so that the number of writes per unit time of the at least one spare flash drive of the third technology type is lower than the predetermined threshold number.

* * * * *